(12) United States Patent
Ahrens et al.

(10) Patent No.: US 6,823,482 B2
(45) Date of Patent: Nov. 23, 2004

(54) SYSTEM AND METHOD FOR REPORTING PLATFORM ERRORS IN PARTITIONED SYSTEMS

(75) Inventors: George Henry Ahrens, Pflugerville, TX (US); Douglas Marvin Benignus, Dime Box, TX (US); Arthur James Tysor, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 09/801,603

(22) Filed: Mar. 8, 2001

(65) Prior Publication Data

US 2002/0129305 A1 Sep. 12, 2002

(51) Int. Cl.[7] ................................................ G06F 11/30
(52) U.S. Cl. .............................. 714/57; 714/20; 714/48
(58) Field of Search .............................. 714/26, 48, 57, 714/20, 10

(56) References Cited

U.S. PATENT DOCUMENTS

| | | | | | |
|---|---|---|---|---|---|
| 5,748,884 A | * | 5/1998 | Royce et al. | ................. | 714/57 |
| 5,805,790 A | * | 9/1998 | Nota et al. | .................... | 714/10 |
| 5,872,970 A | * | 2/1999 | Pickett et al. | ............... | 718/101 |
| 5,878,205 A | * | 3/1999 | Greenstein et al. | ........... | 714/11 |
| 5,892,898 A | * | 4/1999 | Fujii et al. | .................... | 714/57 |
| 6,021,262 A | * | 2/2000 | Cote et al. | .................... | 714/48 |
| 6,298,457 B1 | * | 10/2001 | Rachlin et al. | ............... | 714/49 |
| 6,615,374 B1 | * | 9/2003 | Moran | ......................... | 714/48 |
| 2002/0124213 A1 | * | 9/2002 | Ahrens et al. | ................ | 714/57 |
| 2002/0124214 A1 | * | 9/2002 | Ahrens et al. | ................ | 714/57 |
| 2002/0124215 A1 | * | 9/2002 | Austen et al. | ................ | 714/57 |

* cited by examiner

*Primary Examiner*—Dieu-Minh Le
*Assistant Examiner*—Yolanda L Wilson
(74) *Attorney, Agent, or Firm*—Joseph T. Van Leeuwen; Diana L. Roberts

(57) ABSTRACT

Hardware errors are stored in an error buffer for processing by one or more system partitions within a computer system. When errors are first placed in the buffer, an Already Reported Flag (ARF) is initialized to indicate that the error has not yet been reported to any of the system partitions. When one of the system partitions receives the corresponding error information by running a diagnostics routine, the ARF is set indicating that the error has been reported to at least one system partition. The system partition, in turn, uses the ARF information to determine how to handle the corresponding error. In an environment using a remote hardware service provider, the ARF determines whether to transmit the error information to the service provider. In environments without remote service providers, the ARF information is used to highlight newly reported errors to the user.

17 Claims, 5 Drawing Sheets

SYSTEM AND METHOD FOR REPORTING PLATFORM ERRORS IN PARTITIONED SYSTEMS

BACKGROUND OF THE INVENTION

1. Technical Field

The present invention relates to managing partitioned systems. More particularly, the present invention relates to a system and method for reporting platform errors that are detected by the platform and reported to more than one partition within a computer system.

2. Description of the Related Art

Logical partitioning is the ability to make a single multiprocessing system run as if it were two or more independent systems. Each logical partition represents a division of resources in the system and operates as an independent logical system. Each partition is logical because the division of resources may be physical or virtual. An example of logical partitions is the partitioning of a multiprocessor computer system into multiple independent servers, each with its own processors, main storage, and I/O devices. One of multiple different operating systems, such as AIX, LINUX, or others, can be running in each partition.

In a Logically Partioned (LPAR) multiprocessing system, there are a class of errors (Local) that are only reported to the assigned or owning partition's operating system. Failures of I/O adapters which are only assigned to a single partition's operating system are an example of this. There is also another class of errors (Global) that are reported to each partition's operating system because they could potentially affect each partition's operation. Examples of this type are power supply, fan, memory, and processor failures.

Logical partitioning is in common use today because it provides its users with flexibility to change the number of logical partitions in use and the amount of physical system resources assigned to each partition, in some cases while the entire system continues to operate. Logical partitioning is also used because certain applications or work environments may require a particular operating system.

For example, in a home-based business, a particular business application may be written for IBM's AIX® operating system, while another home application may be written for Microsoft "Windows" operating system (such as Windows 98® or Windows 2000®). Rather than having separate computer systems for the various operating systems and applications, logical partitions allow the different applications and operating systems to be executed on the same physical machine. All of the operating systems can be loaded on one or more nonvolatile storage devices, such as hard disk drives (HDD), accessible by the computer system.

In some system environments, diagnostics are executed on the computer system periodically to determine whether the computer system requires maintenance. Services are provided to automatically receive reports from computer systems detailing the maintenance required. The diagnostic software is often included with the operating systems. Because each of the operating systems is using the same underlying hardware, the diagnostics for each operating system in a logically partitioned system is likely to detect and report the same error. In an automated service environment, having multiples of the same errors reported may cause confusion and inefficiencies when servicing the systems. For example, if the AIX operating system detected that a firmware card within the computer was failing, it may send a report to one service organization to install a replacement card in the system. At the same time, another operating system loaded in the machine may report the same problems causing either the same service organization or a different service organization to take action to replace the defective card.

What is needed, therefore, is a way of efficiently noting whether a hardware error has already been reported to one of the operating systems installed on a logically partitioned system.

SUMMARY

It has been discovered that a flag can be used to detect when a hardware error has already been reported to prevent duplicate servicing of the same hardware component. Computer system hardware and firmware cards have multiple components for providing a particular function, such as a video display and communications, to the user. One of these components is a firmware error buffer where information identifying errors that have been detected in hardware are stored. In addition to the error identifiers, an Already Reported Flag (ARF) is included to indicate whether the error has been reported to at least one operating system.

When an error is first reported, the ARF is set to "no" (i.e., "0"). After the first operating system requests error information and receives the error identifier, the ARF is set to "yes" (i.e., "1"), indicating that the corresponding error has been provided to one of the operating systems. Subsequently, when another operating system requests error information and retrieves the errors stored in the error buffer, the ARF will be used to indicate that the particular error has already been reported to one of the operating systems.

When the operating system retrieves the errors using diagnostics, it will create a report of detected errors in order to take corrective action to repair or maintain the computer system. For example, the errors with the ARF set to "no" can be highlighted to inform the user or service organization that these errors are newly reported. On the other hand, the report may note which errors have previously been reported so that a service or individual does not replace a component more than once.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
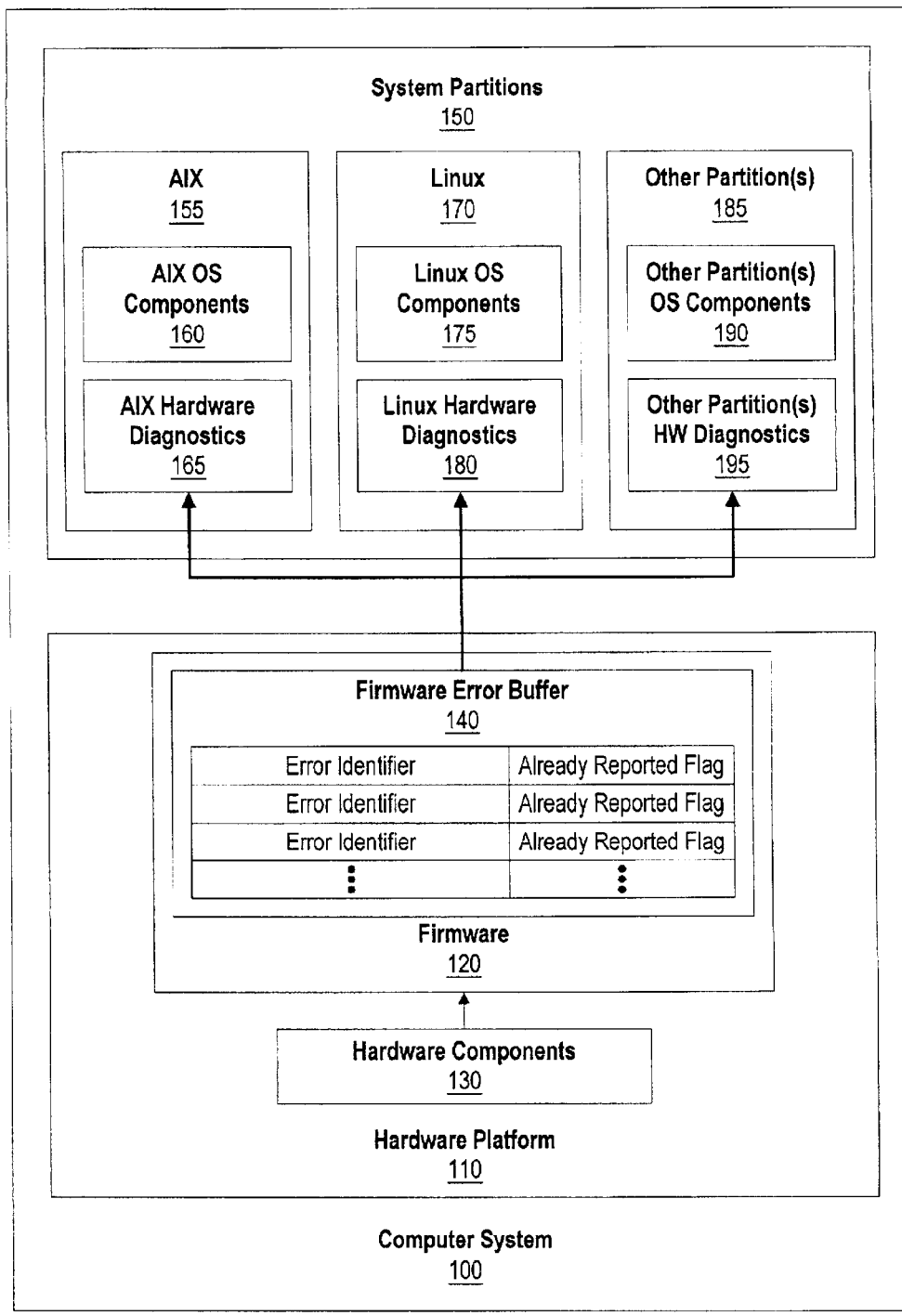
FIG. 1 is a high level diagram of a computer system with multiple system partitions and a hardware platform.

FIG. 1 shows a high level diagram of a computer system with multiple system partitions and a hardware platform. Computer system 100 includes hardware platform 110 and logical system partitions 150. Hardware platform 110 includes the physical system that is used by a user by interacting with one of the operating systems included in system partitions 150. As such, hardware platform 110 includes one or more hardware components 130 and firmware 120.

Hardware components 130, such as fans, processors, power supplies, etc., may from time to time report errors and other abnormal conditions. These errors are captured by firmware 120 and recorded and stored in firmware error buffer 140. Firmware error buffer 140 has storage space for an error identifier and the Already Reported Flag (ARF) associated with each error. When the error is initially reported, the ARF is initialized to "0" to indicate that the error has not yet been reported to a diagnostic running within one of the system partitions 150.

System partitions 150 are shown with two or more partitions operating within computer system 100. Some system partitions may be active, or operating, at the same time other system partitions are active, while others may be inactive until they are initiated, or "booted", by the user. System partitions 150 shown include AIX partition 155, Linux operating system 170, and other partition(s) 185. Each of these partitions include operating system components (AIX operating system components 160, Linux operating system components 175, and other partition(s) operating system components 190) that are used to operate computer system 100 using various software program applications. One of the programs operating in each system partitions may be one or more diagnostic routines (AIX hardware diagnostics 165, Linux hardware diagnostics 180, and other partition(s) hardware diagnostics 195). These diagnostics may be automatically invoked when the partition is booted, may be executed at a certain time interval, or may be requested by a user or external service process.

When a diagnostic routine is executed, one of the operations it performs is retrieving error information from the hardware platform. As previously discussed, hardware error information is stored in one or more buffers, such as firmware error buffer 140, for eventual notification of the user that a hardware error condition exists. The diagnostic routines (165, 180, and 195), each receive data from firmware error buffer 140. The data retrieved identifies the error (Error Identifier) as well as whether the error has already been reported during a previous diagnostic routine (Already Reported Flag). Consequently, the diagnostic routine, operating system, and the user can take different approaches to a problem depending upon whether the problem has already been reported. For example, if the user received an error message while running AIX hardware diagnostics 165 and ordered a replacement hardware component, a similar diagnostic message from Linux flagged as "Already Reported" can be ignored because the user understands that he has already taken the needed corrective action. Likewise, if a service organization is remotely receiving error reports from various computer systems, the organization can filter out the Already Reported errors to focus on the newly reported errors and prevent redundant work.

Figure 2:
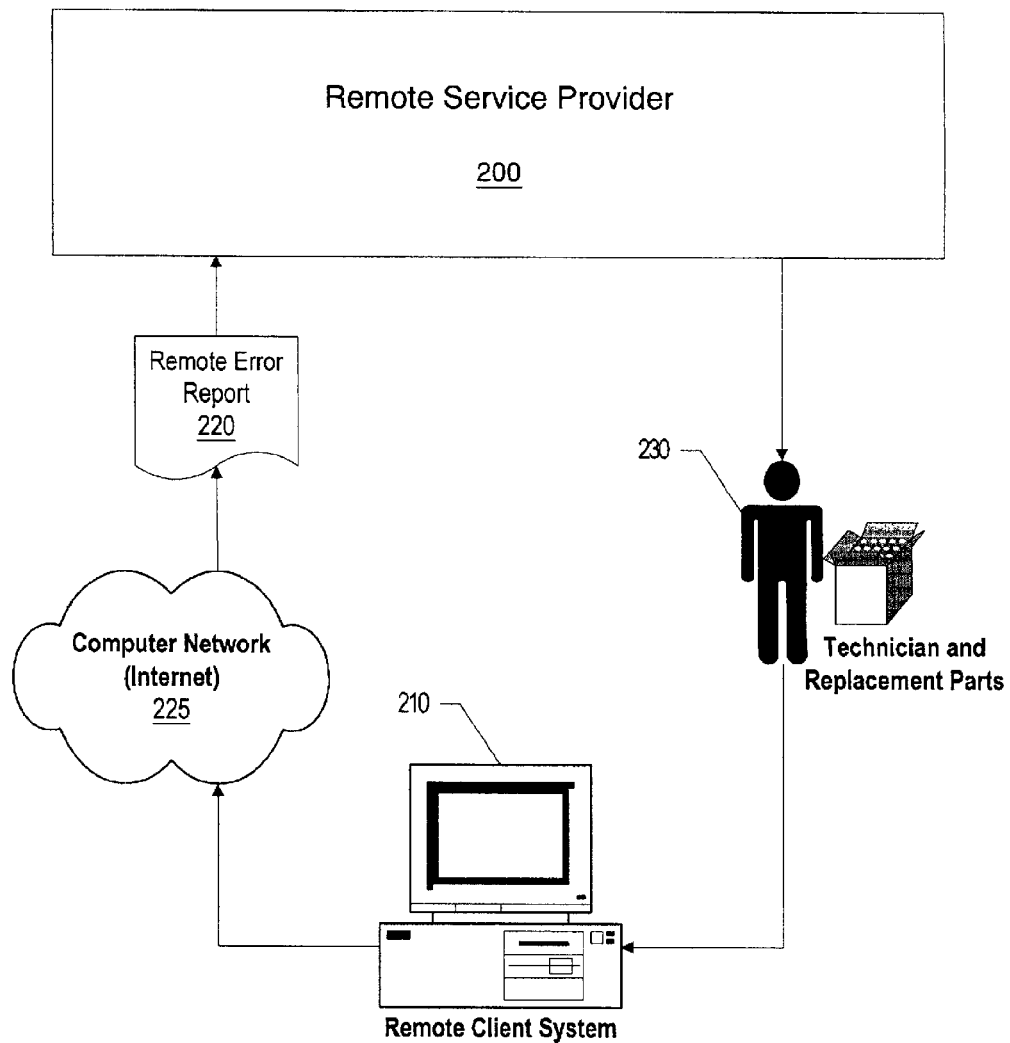
FIG. 2 is a diagram of a remote service provider providing service to a client based upon remote error reports.

FIG. 2 shows a diagram of a remote service provider providing service to a client based upon remote error reports. Remote service provider 200 provides service to a number of client computer systems. Remote service provider 200 may be part of an organization that services the organization's computer systems, or may be a third party vendor that provides service based upon a contractual relationship with businesses and individuals. In order to provide service, remote service provider 200 installs software on remote client system 210 that will send remote error report 220 to the remote service provider when an error is detected. Periodically, or when an error is detected, remote client system 210 sends remote error report 220 to remote service provider 200. Remote error report identifies the remote client system and is sent using computer network 225, such as the Internet, or by using a modem to dial into remote service provider 200 and transmit the error report.

In one embodiment, remote client system is configured to only include error information in remote error report 220 that is new (i.e., where the ARF flag has not been set). Each diagnostic for each partition within remote client system 210 is configured to send a remote error report to the remote service provider when an error is encountered. Using this embodiment, the remote service provider only receives newly discovered errors thereby eliminating redundant service calls to remote client systems.

In another embodiment, remote client system transmits all error information in remote error report 220 along with the ARF. Remote service provider 200 receives the error report and analyzes the ARF to determine whether the error was already reported (i.e., the ARF flag has been set). If the ARF flag has been set, the remote service provider checks to determine whether service has already been dispatched for the reported error.

In response to newly discovered hardware platform errors, technician and replacement parts 230 are dispatched from remote service provider 200 to remote client system 210. In a large scale, such as a national, system providing remote service, the remote service provider may contact field service technicians and inform the technicians of the details regarding the reported error as well as information about the remote client system (i.e., customer's name, address, phone number). The needed replacement parts may then be sent by courier from the remote service provider to either the customer's address or to the technician. Alternatively, the technician may be responsible for obtaining the needed parts.

Figure 3:
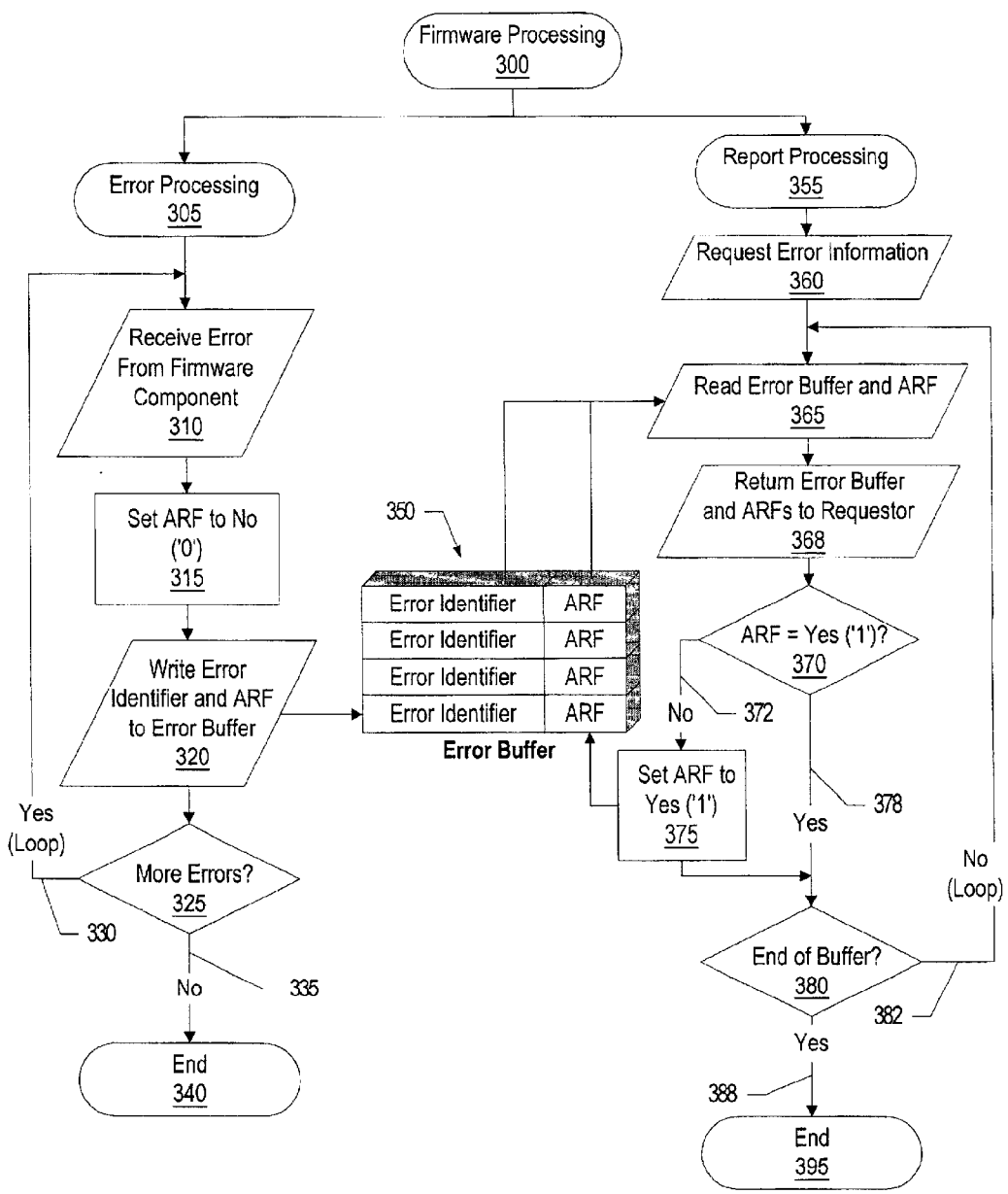
FIG. 3 is a flowchart of firmware processing in identifying errors and providing errors to an operating system upon request.

FIG. 3 shows a flowchart of firmware processing in identifying errors and providing errors to an operating system upon request. Processing commences at 300. Two threads are shown within firmware processing—error processing thread 305 that gathers hardware platform errors and report processing thread 355 that responds to diagnostic requests from various partitions within the computer system.

Error processing thread 305 receives an error from a firmware or other hardware platform component (input 310). The Already Received Flag (ARF) corresponding to the newly received error is initialized to "0" indicating that the error has not yet been reported. The error identifier and the ARF are written (output 320) to error buffer 350. The errors written to error buffer 350 remain in the buffer until the hardware errors are corrected or the buffer is reinitialized.

When another error occurs, decision 325 branches to "yes" branch 330 which loops back to receive the next error. When there are no more errors to report, decision 325 branches to "no" branch whereupon the error processing thread ends at 340.

Report processing thread 355 receives a diagnostic request from one of the partitions in the operating system (input 360). A first line from error buffer 350 is read including the error identifier and corresponding ARF (input 365). The error identifier and corresponding ARF are returned to the requesting partition (output 368). A determination is made as to whether the error identifier has previously been read by one of the partitions (decision 370). If the ARF has not been set (i.e., is not equal to "1"), then decision 370 branches to "no" branch 372 whereupon the ARF for the line read from the buffer is set to "1" (step 375) indicating that the corresponding error information has now been provided to one of the partitions. On the other hand, if the ARF is already set to "1", decision 370 branches to "yes" branch 378 and bypasses the step setting the ARF to "1". A decision is made as to whether the end of error buffer 350 has been reached (decision 380). If the end of the buffer has not been reached, decision 380 branches to "no" branch 382 which loops back to read the next line from the error buffer (back to input 365). When all of the lines from error buffer 350 have been read, decision 380 branches to "yes" branch 388 whereupon report processing to a requesting partition ends at 395. Note that report processing thread 355 is reinvoked when another request for error information is received from one of the partitions.

In some environments, some hardware is allocated to a particular partition. For example, each partition may have at least one processor (CPU) dedicated to the partition. In these environments, each partition may have its own error buffer. Global errors that affect multiple partitions, such as power supplies and fans, are placed in each partition's error buffer with a corresponding ARF set to off ("0"). When a partition requests error information, the error data and corresponding ARFs are passed to the partition and the firmware subsequently sets the ARF for the partition's errors to yes ("1"). In addition, the global errors located in each of the partition's error buffers also have their corresponding ARFs set to yes ("1") indicating that the global error has already been reported to at least one partition.

Figure 4:
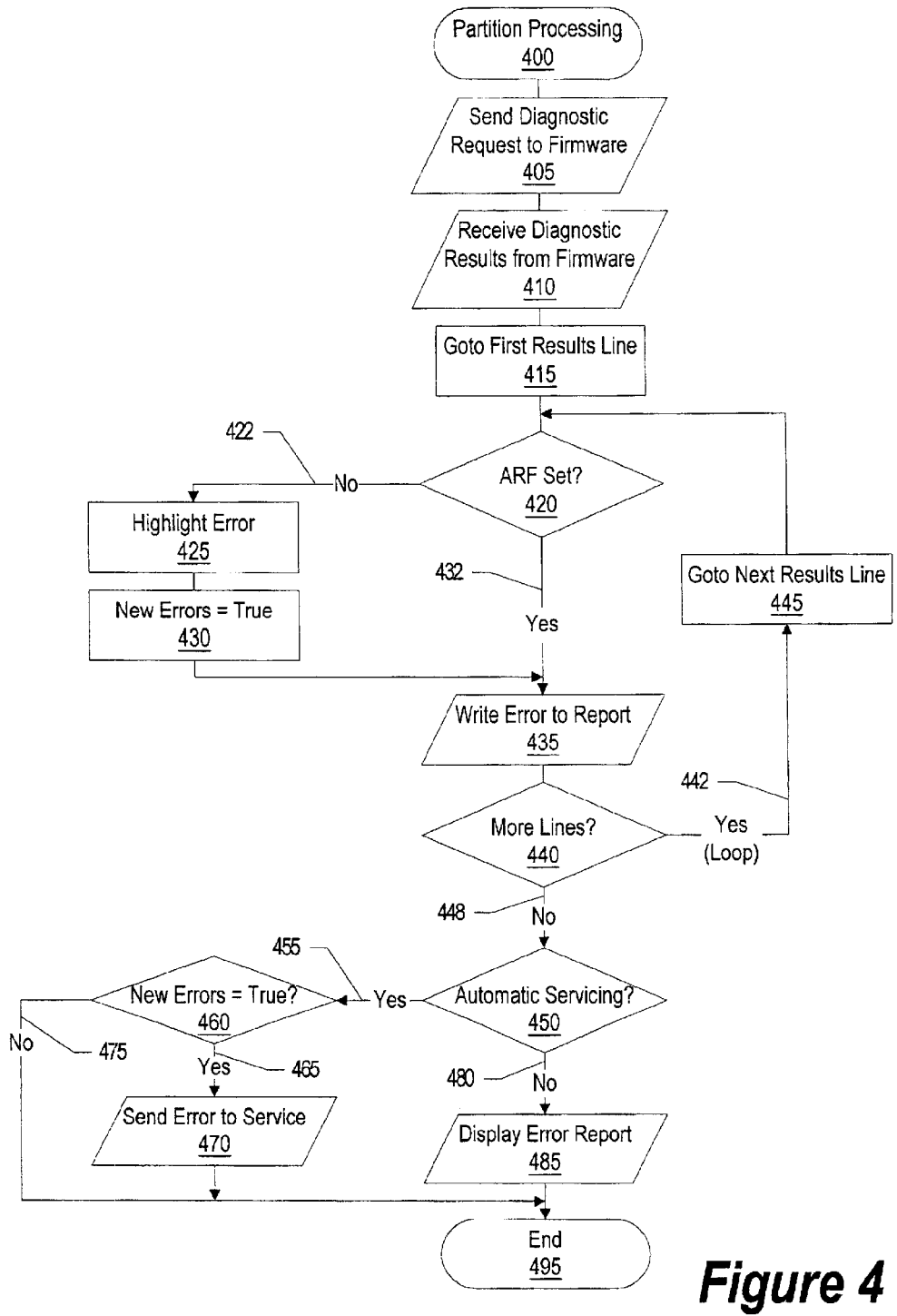
FIG. 4 is an operating system in a partition running diagnostics and taking corrective action based on whether a particular error was previously reported.

FIG. 4 shows an operating system in a partition running diagnostics and taking corrective action based on whether a particular error was previously reported. Partition processing of hardware platform errors commences at 400 whereupon a diagnostic request is sent to the firmware (output 405) to retrieve the contents of the firmware error buffer (see FIG. 3 for details regarding retrieval of the error buffer). The diagnostic results are received from the firmware (input 410). Processing starts by handling the first line from the returned results (step 415). A determination is made as to whether the ARF is set for the first returned line (decision 420). If the ARF is not set (indicating that this is the first time the error has been reported), decision 420 branches to "no" branch 422 whereupon the corresponding error is highlighted for the user (step 425) and a new errors flag is set to True (step 430). On the other hand, if the ARF is set (indicating that this is not the first time that the error has been reported), decision 420 branches to "yes" branch 432 which bypasses the highlighting step. The error information, along with any added highlighting, is written to a report (output 435). A determination is made as to whether there are more lines to process from the results received from firmware (decision 440). If there are more lines, decision 440 branches to "yes" branch 442 which processes the next line from the returned results (step 445) and loops back to process the next line. This looping continues until no more lines from the results need to be processed, at which time decision 440 branches to "no" branch 448.

A determination is made as to whether the computer system uses a remote service provider to automatically provide service to the computer system (decision 450). If the computer system does use a remote service provider, decision 450 branches to "yes" branch 455 whereupon another decision is made as to whether any new errors have been reported (decision 460). If new error have been reported during this diagnostic, decision 460 branches to "yes" branch 465 whereupon the reported errors are sent to the remote service provider for handling (output 470). The errors may be sent electronically, for example over the Internet or using a modem connection. In addition, output 470 may be filtered to only include new errors (i.e., those errors where the ARF has not been set) so that the remote service provider does not receive redundant error reports. If there are no new errors, decision 460 branches to "no" branch 475 which bypasses sending the errors to the remote service provider.

If the computer system does not receive automatic servicing from a remote service provider, decision 450 branches to "no" branch 480 whereupon the error report is displayed for the user (output 485). New errors included on the displayed report are highlighted to focus the user's attention on the new errors that have not previously been reported. In some embodiments, such as environments where the computer system is used by a user and remote service is also provided, the report is displayed in addition to the errors being provided to the remote service provider. Partition diagnostic processing ends at 495.

Figure 5:
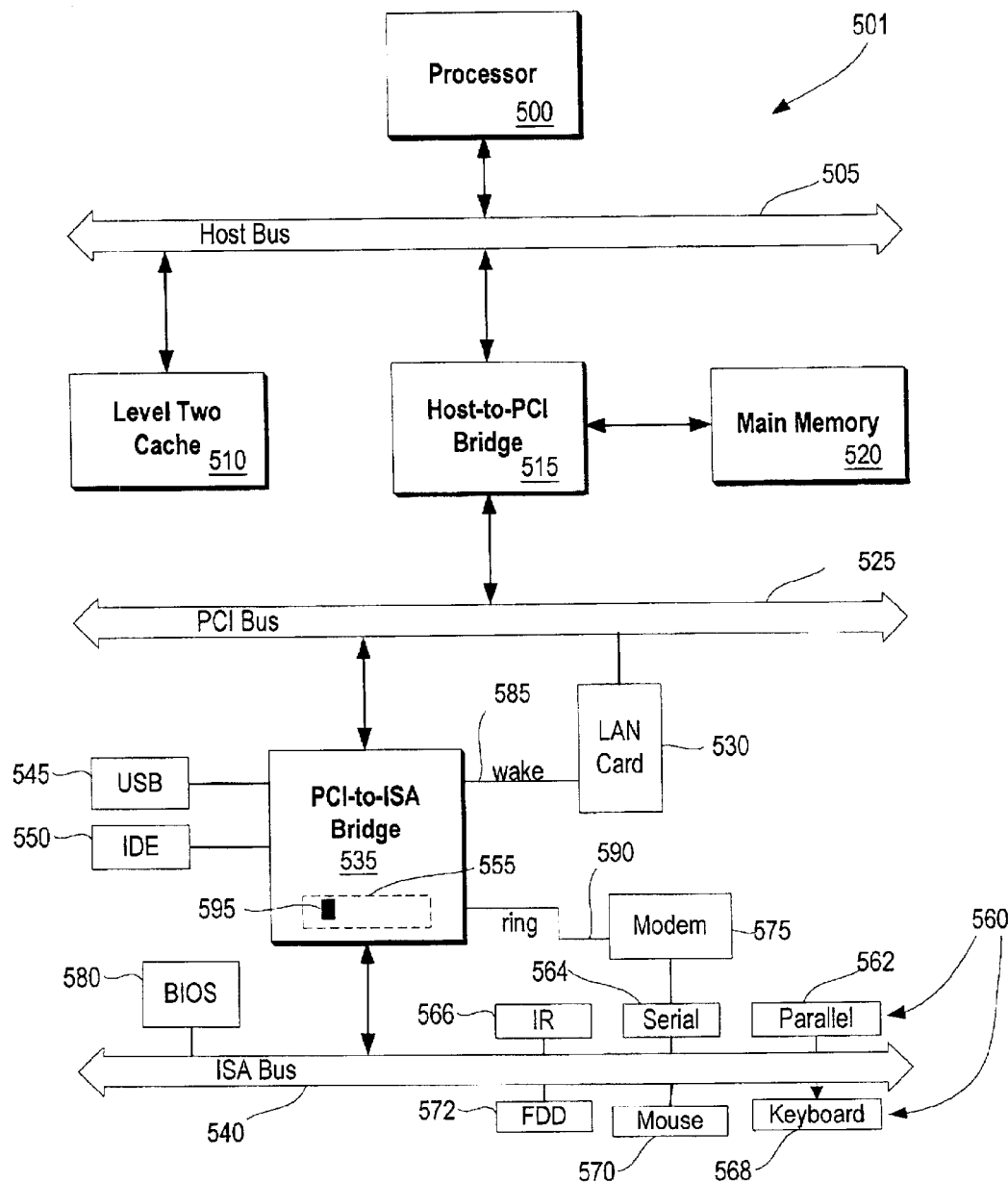
FIG. 5 is a block diagram of an information handling system capable of performing the present invention.

FIG. 5 illustrates information handling system 501 which is a simplified example of a computer system capable of performing the copy processing described herein. Computer system 501 includes processor 500 which is coupled to host bus 505. A level two (L2) cache memory 510 is also coupled to the host bus 505. Host-to-PCI bridge 515 is coupled to main memory 520, includes cache memory and main memory control functions, and provides bus control to handle transfers among PCI bus 525, processor 500, L2 cache 510, main memory 520, and host bus 505. PCI bus 525 provides an interface for a variety of devices including, for example, LAN card 530. PCI-to-ISA bridge 535 provides bus control to handle transfers between PCI bus 525 and ISA bus 540, universal serial bus (USB) functionality 545, IDE device functionality 550, power management functionality 555, and can include other functional elements not shown, such as a real-time clock (RTC), DMA control, interrupt support, and system management bus support. Peripheral devices and input/output (I/O) devices can be attached to various interfaces 560 (e.g., parallel interface 562, serial interface 564, infrared (IR) interface 566, keyboard interface 568, mouse interface 570, and fixed disk (FDD) 572) coupled to ISA bus 540. Alternatively, many I/O devices can be accommodated by a super I/O controller (not shown) attached to ISA bus 540.

BIOS 580 is coupled to ISA bus 540, and incorporates the necessary processor executable code for a variety of low-level system functions and system boot functions. BIOS 580 can be stored in any computer readable medium, including magnetic storage media, optical storage media, flash memory, random access memory, read only memory, and communications media conveying signals encoding the instructions (e.g., signals from a network). In order to attach computer system 501 another computer system to copy files over a network, LAN card 530 is coupled to PCI-to-ISA bridge 535. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for reporting hardware platform errors, said method comprising:
    storing error data corresponding to each hardware platform error in a storage area, wherein the error data includes a flag indicating whether the error data has been reported;
    reporting the error data;
    receiving a request from one of the partitions;
    providing the error data to the requesting partition; and
    setting the flag corresponding to the provided error data indicating that at least one partition has been notified of the error.

2. The method as described in claim 1 wherein the error data is stored in an error buffer.

3. The method as described in claim 1 further comprising:
    receiving the error data at one of the partitions; and
    determining whether the errors included in the error data have previously been reported to at least one partition, the determination including analyzing the flag corresponding to each error.

4. The method as described in claim 3 further comprising:
    transmitting one or more errors included in the error data in response to the determination being that the one or more errors have not previously been reported.

5. The method as described in claim 3 further comprising:
    highlighting one or more errors included in the error data in response to the determination that the one or more errors have not previously been reported; and
    displaying the highlighted errors on a display device.

6. The method as described in claim 1 further comprising:
    receiving the hardware platform error from a component included in the hardware platform;
    setting the flag corresponding to the hardware platform error to indicate that the error has not been provided to at least one of the partitions;
    determining an error identifier that corresponds to the error; and
    writing the error identifier and the corresponding flag to an error buffer.

7. An information handling system comprising:
    one or more processors;
    a memory accessible by the processors;
    one or more nonvolatile storage devices accessible by the processors, the nonvolatile storage devices including one or more system partitions;
    an error buffer for storing errors detected in the information handling system; and
    a error handling tool to manage the detected errors, the error handling tool including:
    means for identifying one or more errors corresponding to the information handling system;
    means for including error data for each of the errors in the error buffer, wherein the error data includes a flag corresponding to each error indicating whether at least one system partition has been notified of the error;
    means for receiving a request from one of the partitions;
    means for providing the error data to the requesting partition; and
    means for setting the flag corresponding to the provided error data indicating that at least one partition has been notified of the error.

8. The information handling system as described in claim 7 further comprising:
    means for receiving the error data at one of the system partitions; and
    means for determining whether the errors included in the error data have previously been reported to at least one system partition, the determining including analyzing the flag corresponding to each error.

9. The information handling system as described in claim 8 further comprising:
    a network interface for transmitting information to a second computer system; and
    means for transmitting one or more errors included in the error data to the second computer using the network interface, the transmitting performed in response to determining that the one or more errors have not previously been reported to at least one system partition.

10. The information handling system as described in claim 8 further comprising:
   a display device accessible by the processors;
   means for highlighting one or more errors included in the error data in response to determining that the one or more errors have not previously been reported to at least one system partition; and
   means for displaying the highlighted errors on a display device.

11. The information handling system as described in claim 7 further comprising:
   one or more components accessible by the processors;
   means for receiving the error from one of the components;
   means for setting the flag corresponding to the error to indicate that the error has not been provided to at least one of the system partitions;
   means for determining an error identifier that corresponds to the error; and
   means for writing the error identifier and the corresponding flag to the error buffer.

12. A computer program product for providing hardware platform errors, said computer program product comprising:
   means for identifying one or more errors corresponding to the hardware platform; and
   means for including error data for each of the errors in a storage area, wherein the error data includes a flag corresponding to each error indicating whether at least one partition has been notified of the error;
   means for receiving a request from one of the partitions;
   means for providing the error data to the requesting partition; and
   means for setting the flag corresponding to the provided error data indicating that at least one partition has been notified of the error.

13. The computer program product as described in claim 12 wherein the error data is stored in an error buffer.

14. The computer program product as described in claim 12 further comprising:
   means for receiving the error data at one of the partitions; and
   means for determining whether the errors included in the error data have previously been reported to at least one partition, the determining including analyzing the flag corresponding to each error.

15. The computer program product as described in claim 14 further comprising:
   means for transmitting one or more errors included in the error data in response to the determining that the one or more errors have not previously been reported.

16. The computer program product as described in claim 14 further comprising:
   means for highlighting one or more errors included in the error data in response to the determining that the one or more errors have not previously been reported; and
   means for displaying the highlighted errors on a display device.

17. The computer program product described in claim 12 further comprising:
   means for receiving the error from a component included in the hardware platform;
   means for setting the flag corresponding to the error to indicate that the error has not been provided to at least one of the partitions;
   means for determining an error identifier that corresponds to the error; and
   means for writing the error identifier and the corresponding flag to an error buffer.

* * * * *